US006450449B1

(12) United States Patent
Podob et al.

(10) Patent No.: US 6,450,449 B1
(45) Date of Patent: Sep. 17, 2002

(54) CRASHWORTHY SEAT

(75) Inventors: Roger Podob, Lexington Park, MD (US); Joseph Courtland Elliott, II, Toronto (CA)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/841,769

(22) Filed: Apr. 25, 2001

(51) Int. Cl.[7] .............................................. B64D 11/06
(52) U.S. Cl. ................................ 244/122 R; 244/118.5
(58) Field of Search ..................... 244/122 R, 118.5, 244/118.6, 137.2

(56) References Cited

U.S. PATENT DOCUMENTS

| | | | | |
|---|---|---|---|---|
| 4,336,868 A | * | 6/1982 | Wilson et al. ............... 188/376 |
| 4,349,167 A | * | 9/1982 | Reilly ......................... 188/372 |
| 4,523,730 A | * | 6/1985 | Martin ................... 244/122 R |
| 4,525,010 A | * | 6/1985 | Trickey et al. .......... 244/122 R |
| 4,790,496 A | * | 12/1988 | Marrujo .................. 244/122 R |
| 4,796,837 A | * | 1/1989 | Dowd ..................... 244/122 R |
| 4,861,103 A | * | 8/1989 | Vallee ........................ 188/377 |
| 4,911,381 A | * | 3/1990 | Cannon et al. .......... 244/122 R |
| 4,997,233 A | * | 3/1991 | Sharon ........................ 188/374 |
| 5,125,598 A | * | 6/1992 | Fox .............................. 244/122 |
| 5,152,578 A | * | 10/1992 | Kiguchi ...................... 188/371 |
| 5,273,240 A | * | 12/1993 | Sharon ........................ 188/271 |
| 5,338,090 A | * | 8/1994 | Simpson et al. ........... 297/216.2 |
| 5,558,301 A | * | 9/1996 | Kerdoncuff et al. ...... 244/118.6 |
| 5,676,336 A | * | 10/1997 | Nefy et al. ............... 244/118.6 |
| 5,788,185 A | * | 8/1998 | Hooper .................... 244/118.6 |
| 5,836,547 A | * | 11/1998 | Koch et al. .............. 244/118.6 |
| 5,842,669 A | * | 12/1998 | Ruff ........................... 188/375 |
| 5,961,073 A | * | 10/1999 | Wittmann ............... 244/122 B |
| 6,152,401 A | * | 11/2000 | Green ..................... 244/118.6 |
| 6,299,103 B1 | * | 10/2001 | Shope et al. ............ 244/122 A |

* cited by examiner

Primary Examiner—Charles T. Jordan
Assistant Examiner—Stephen A Holzen
(74) Attorney, Agent, or Firm—Ron Billi

(57) ABSTRACT

An apparatus for repositioning an occupant in response to a crash event including a seat, a pivot and an energy absorber. In response to the force of a crash, the energy absorber absorbs at least a portion of the energy of the crash and allows the seat to move to a more desirable position. An accelerometer may be used to generate a signal in response to a crash to activate an explosive charge and cause the seat to pivot to a more desirable position.

8 Claims, 6 Drawing Sheets

CRASHWORTHY SEAT

BACKGROUND OF THE INVENTION

The present invention relates to seats for use in aircraft, such as, helicopters. More specifically, but without limitation, the present invention relates to a crashworthy seat that repositions the occupant prior to and/or during a crash event to increase the survivability of the occupant and decrease the harmful effects of a crash.

There have been many attempts to improve occupant survivability in a crash, especially with regard to helicopters. Such efforts have recently been directed to the occupant seat assembly including the seat frame, seat base and related parts. These crashworthy seat assemblies have been developed to stroke (i.e. to move usually in a downward direction relative to the aircraft floor) upon severe impact and usually activate energy absorbing devices thereby absorbing all or a portion of the crash energy transmitted to the seat. These seat assemblies may also be designed to plastically deform upon impact thereby absorbing an additional amount of the crash energy. As a result, the forces and accelerations experienced by an occupant in a crash are reduced and frequently minimize or eliminate injuries and save lives.

However, the amount of energy that can be absorbed is limited by the efficiency of the energy absorbing devices, the total distance available for the seat to stroke, and the energy absorbing capabilities of the plastically deformed seat assembly. In addition, it has been determined that a stroking seat sometimes causes the control stick of a helicopter to be impaled into the body or head of the pilot causing additional injuries.

Another problem associated with current seats is the positioning of the occupant. Most seats position the occupant in a substantially upright position prior to a crash. During a crash event, the seat remains substantially upright even in cases where the seat strokes or otherwise moves to absorb impact. As a result, an occupant's spine can be placed in severe compression from the force of the crash; the occupant's head and body are vulnerable to impacting the control stick or other object; the seat shoulder straps are subject to large forces which tend to stretch the strap material; the occupant is subject to submarining, that is, being forced under and out of the seat belt due to the force of the crash; and the occupant's internal organs are subjected to compressive forces due to, for example, compression of the abdomen.

There is thus a critical need in the art to provide an improved seat assembly that exhibits the benefits and advantages of existing designs and also provides additional protection during a crash event.

There is also a critical need to provide an improved seat assembly that exhibits the benefits and advantages of existing designs yet will prevent the control stick of a helicopter, for example, from contacting or being impaled into the body or head of the occupant.

There is a further critical need to provide an improved seat assembly that will place an occupant in a position that will reduce injury to internal organs and increase the magnitude of the crash event that an occupant can survive.

There is a critical need to provide an improved seat assembly that will reduce the undesirable effects of submarining and decrease the forces applied to the restraining belts.

There is another critical need to provide an improved seat assembly that can provide the improvements and benefits of the present invention while minimally impacting existing seat components, such as, restraint systems, inertia reels and armor plates.

SUMMARY OF THE INVENTION

Accordingly, the preferred embodiment of the present invention includes a seat for supporting an occupant, first and second energy absorbers for absorbing at least a part of the impact of a crash and a pivot for repositioning the seat to a more desirable attitude. In operation, the energy absorbing devices react to the force of a crash event when the force exceeds a predetermined value to allow or cause the seat to be repositioned to a more desirable attitude. Other embodiments of the present invention are included.

BRIEF DESCRIPTION OF THE DRAWINGS

Other objects, features and advantages of the present invention will become more fully apparent from the following detailed description of the preferred embodiment, the appended claims and the accompanying drawings in which.

DETAILED DESCRIPTION OF THE PREFERRED EMBODIMENT

Figure 1:
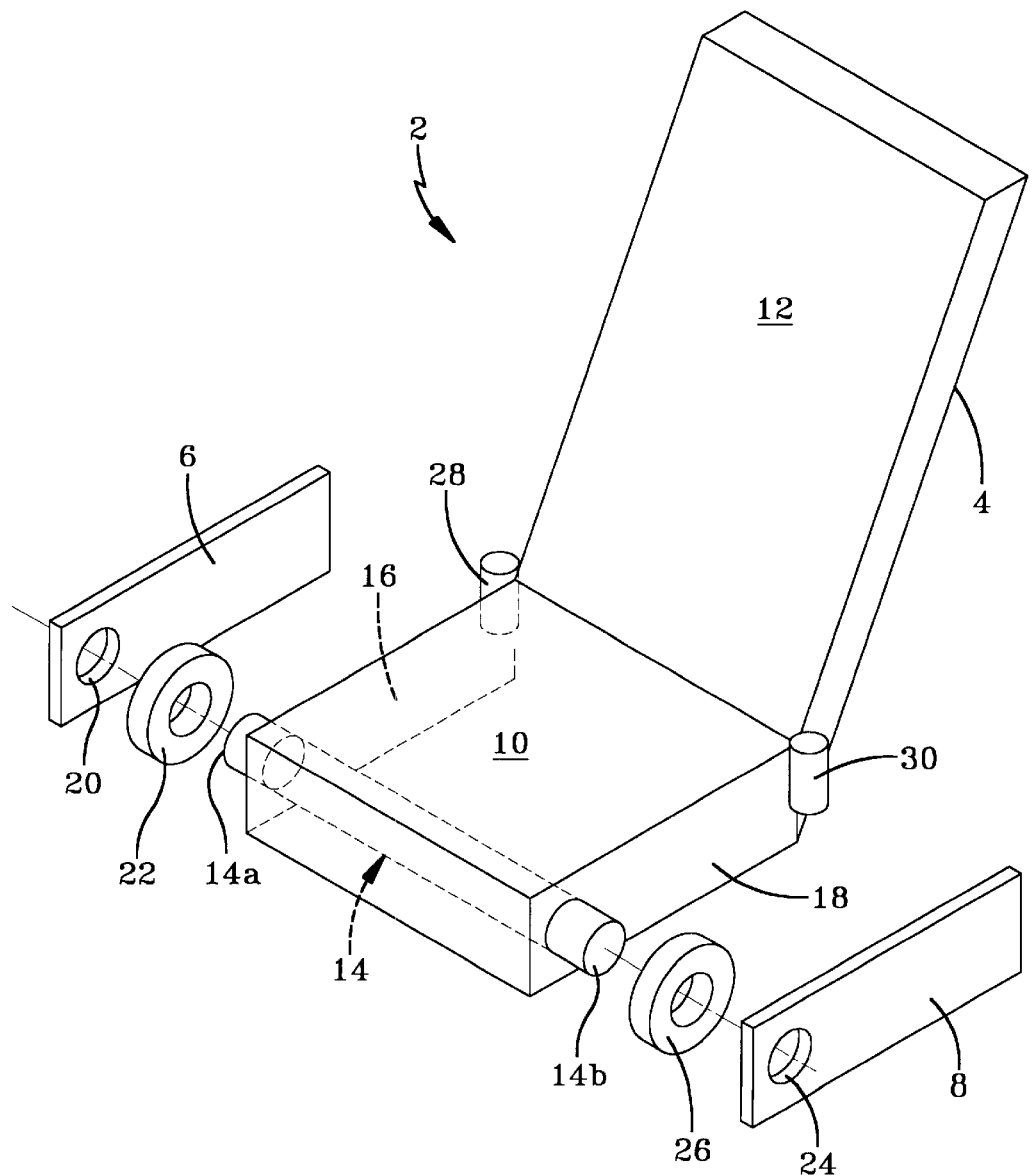
FIG. 1 is a view showing the preferred embodiment of the present invention wherein the seat pivots about an axis.

The preferred embodiment of the present invention is illustrated by way of example in FIG. 1. As shown in FIG. 1, crashworthy seat assembly 2 includes seat 4, pivot tube 14, and energy absorbers 28 and 30. Seat 4 (supporting means) includes base 10 and back 12. FIG. 1 shows pivot tube 14 attached to the forwardly portion of base 10, end 14a extending outwardly from side 16 and end 14b extending outwardly from side 18. Ends 14a and 14b communicate with bores 20 and 24 respectively via bearings 22 and 26 respectively. Note that bearing 22 is located in bore 20 of first rail 6 and bearing 26 is located in bore 24 of second rail 8. One end of energy absorber 28 is attached to side 16 and the other end of energy absorber 28 is attached to first rail 6. Likewise, one end of energy absorber 30 is attached to side 18 and the other end of energy absorber 30 is attached to second rail 8. Energy absorbers 28 and 30 may be attached to other suitable locations such as, for example, the floor of a helicopter. In the embodiment of FIG. 1, it is preferred that energy absorbers 28 and 30 are located rearwardly of pivot tube 14. However, it should be noted that the relative locations of pivot tube 14 and energy absorbers 28 and 30 may be changed to effect a different movement of seat 4 such as, for example, pivot tube 14 may be located more rearwardly than as shown in FIG. 1. A suitable and preferred energy absorber is part #100014-001, manufactured and commercially available from Simula Safety Systems, Incorporated, Applied Technologies Division, 7414 South Harl Avenue, Tempe, Ariz. 85283-4307. Other types of energy absorbing devices may be substituted by those skilled in the art, for example, a wire bending device, hydraulic damper or crushable honeycomb may be used. First rail 6 and second rail 8 are attached to a suitable attachment point such as the floor of a helicopter (not shown) and are positioned and arranged in a parallel fashion to communicate with ends 14a and 14b via bearings 22 and 26 respectively. It can thus be seen that when sufficient force is applied to energy absorbers 28 and 30, for example, in a crash, seat 4 will deform energy absorbers 28 and 30 and pivot rearwardly about the longitudinal axis of pivot tube 14 thus causing an occupant to be repositioned to a more reclining position. Energy absorbers 28 and 30 control the speed and duration of rotation of seat 4 and limit the maximum degree of repositioning. Other energy absorbing systems, for example, stroking systems may be simultaneously or subsequently activated. It should be noted that seat assembly 2 may be fitted into existing systems and operate in conjunction with existing systems or operate independently of existing systems.

Figure 2A:
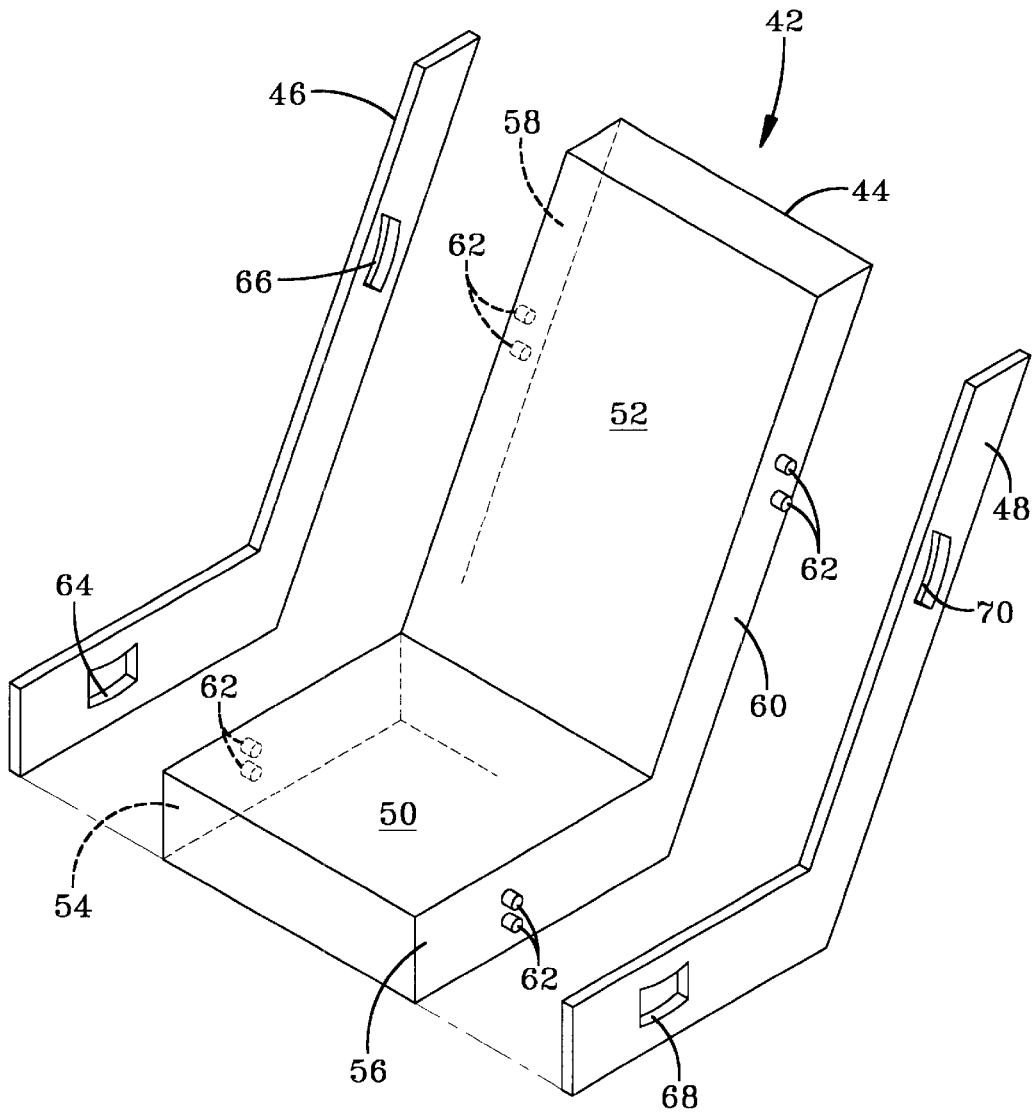
FIG. 2a is a view showing an embodiment of the present invention wherein the seat moves in guide tracks.

FIG. 2a shows another embodiment of the present invention wherein seat assembly 42 includes seat 44, first rail 46 and second rail 48. Seat 44 (supporting means) includes base 50 and back 52. Base 50 includes first side 54 and second side 56 and back 52 includes first side 58 and second side 60. Each side 54, 56, 58 and 60 includes a pair of rollers 62 attached to and extending outwardly from its respective side. First rail 46 includes first and second guide tracks 64 and 66 and second rail 48 includes first and second guide tracks 68 and 70.

Figure 2B:
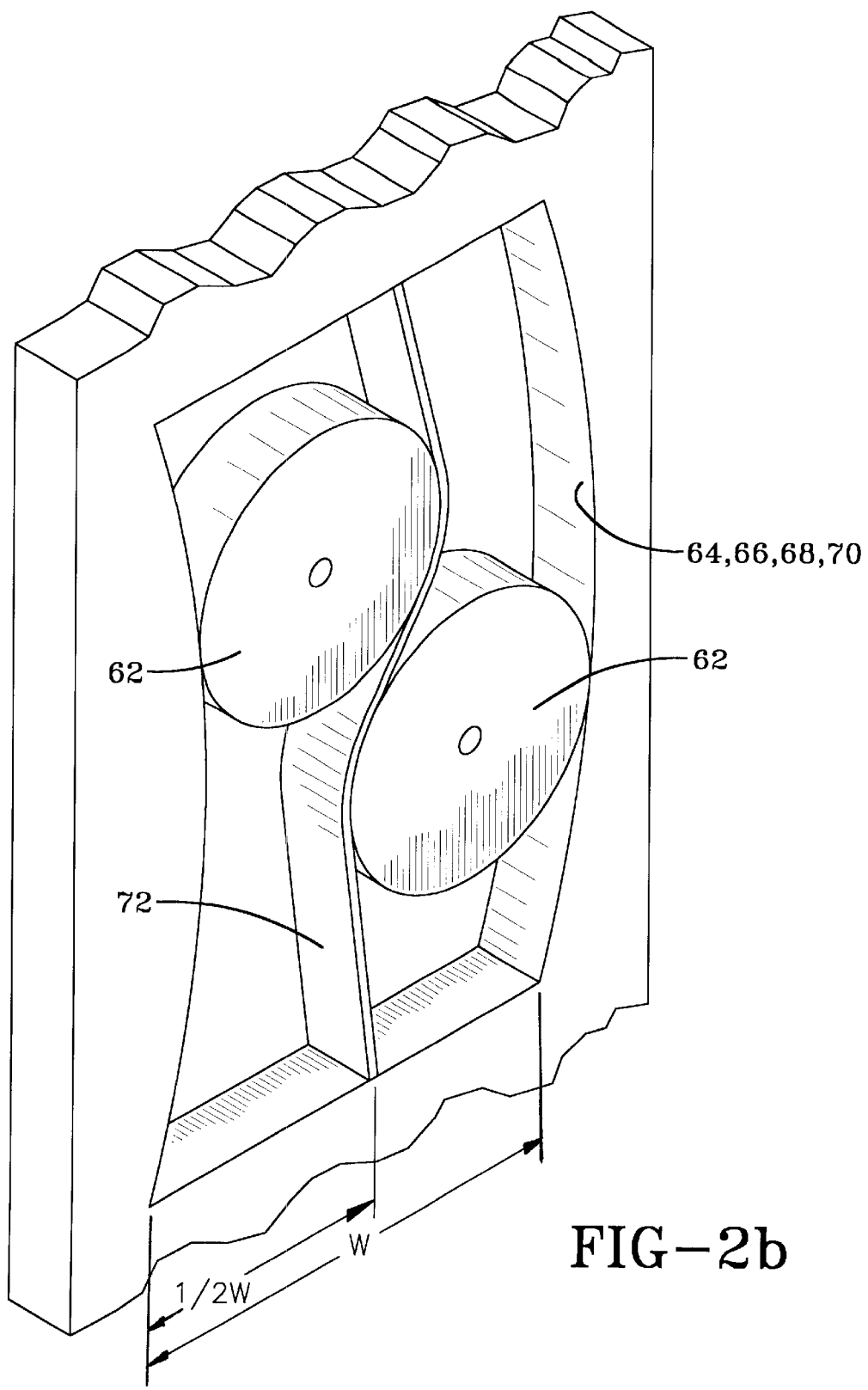
FIG. 2b is a view-showing a typical guide track.

FIG. 2b shows a detail of guide track 66 and is typical of all the guide tracks 64, 66, 68 and 70. Energy absorbing rectangular wire 72 (other shapes of wire may also be used) is located in the approximate center of guide track 66. Rollers 62 are located inside guide track 66 on opposite sides of rectangular wire 72. Note, that the diameters of rollers 62 are greater than one half the width of track 66 thereby causing rectangular wire 72 to form a curved, i.e. S, shape. It can thus be seen that rollers 62, energy absorbing wire 72 and guide track 66 communicate in such a way that rollers 62 cannot move along the curves of its guide track without deforming its respective energy absorbing wire 72 (in an S shape) as it moves. Each guide track is shaped, for example, in the form of a curve thereby guiding its respective rollers (and seat 44) in the predetermined path defined by the curve. It should be noted that each guide track 64, 66, 68 and 70 along with its respective energy absorbing wire and rollers operate in a like fashion. Each guide track, energy absorbing wire and associated rollers form an energy absorbing device (EAD) and communicate to absorb energy and to guide a portion of seat 44 along the curve of that guide track. Each guide track may have a different curve, if desired. Prior to a crash event, each pair of rollers is maintained at one end of its respective guide track by the initial positioning (and sizing) of the energy absorbing wire 72. Energy absorbing wire is attached to the guide track at this end. The other end of energy absorbing wire 72 may be unattached or attached to its respective guide track, for example, in the approximate center of the guide track as shown in FIG. 2b. When a crash event occurs and the combined forces acting on the rollers 62 exceed the yield strength of the energy absorbing wires 72, seat 44 moves along the predetermined path defined by the curves of guide tracks 64, 66, 68 and 70, simultaneously and continuously deforming energy absorbing wires 72. The bending of energy absorbing wires 72 dissipates a portion of the crash energy and allows seat 44 to be repositioned to a more desirable attitude. Seat 44 may be repositioned in any desired position and for many purposes such as, for example, to accommodate cockpit space limitations, to move the occupant away from potential hazards such as the helicopter control stick, and/or to accomplish a redistribution of the crash energy on the occupant. It should be noted that guide tracks 64, 66, 68 and 70 may also be configured to reposition seat 44 in an asymmetrical fashion, for example, base 50 may be repositioned downwardly and forwardly while back 52 may be repositioned downwardly and rearwardly. In such a case, it may be necessary to provide a pivot, for example, at the junction of base 50 and back 52. It may also be desirable to effect a non simultaneous repositioning of seat 44 by providing energy absorbing wires of different yield strengths thereby allowing, for example, the energy absorbing wires of guide tracks 66 and 70 to first begin to yield and thereafter allowing the energy absorbing wires of guide tracks 64 and 68 to begin to yield. Obviously, many other configurations are possible.

Figure 3A:
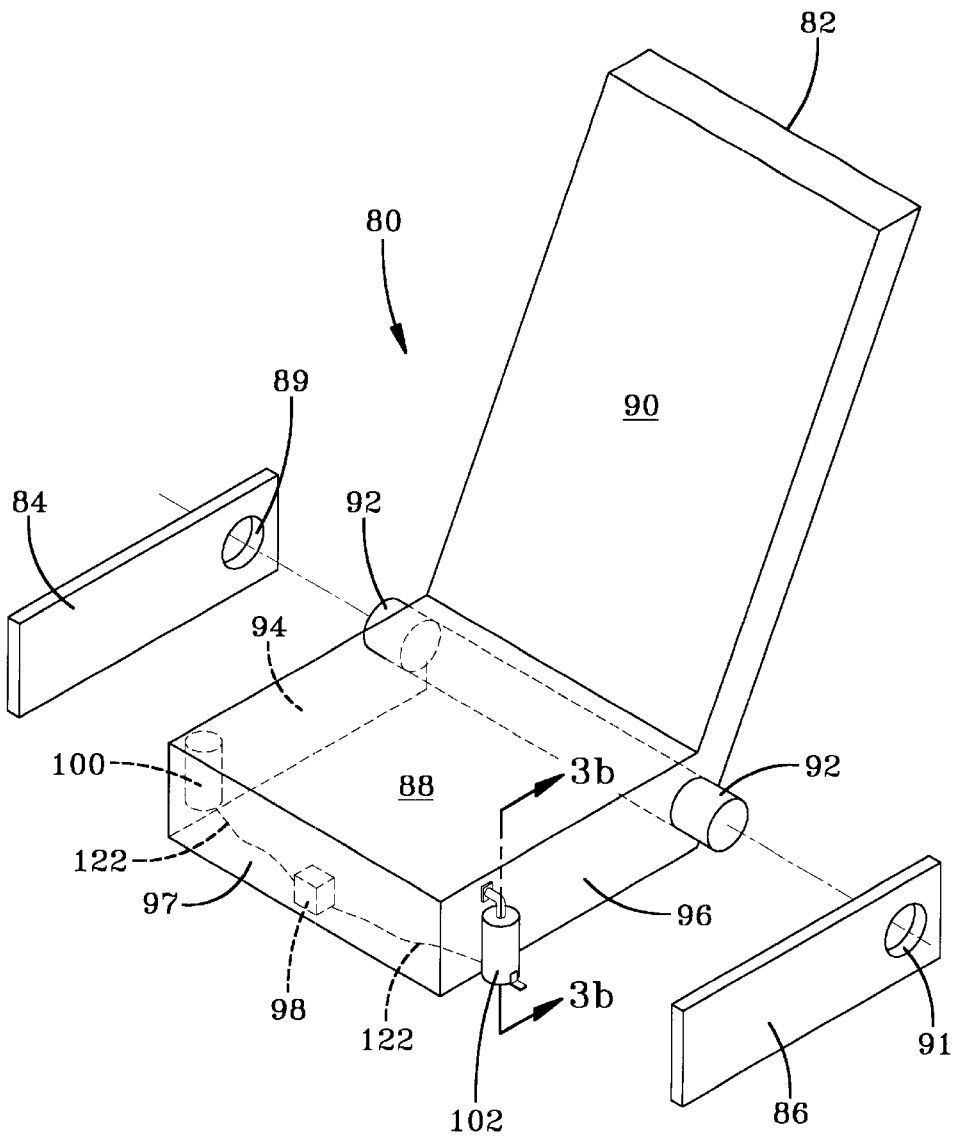
FIG. 3a is a view showing an embodiment of the present invention wherein an accelerometer and activator communicate to cause the seat to pivot about an axis.

FIG. 3a shows an embodiment of the present invention wherein seat assembly 80 includes seat 82 (supporting means), first rail 84 and second rail 86. Seat 82 includes base 88 and back 90. Base 88 includes first side 94, second side 96 and front 97. As shown in FIG. 3a, seat 82 includes pivot 92 extending outwardly from first side 94 and second side 96 and located at the approximate junction of base 88 and back 90. Seat 82 may pivot about the axis of pivot 92. Pivot 92 communicates with bore 89 located in first rail 84 and with bore 91 located in second rail 86. Both first rail 84 and second rail 86 are attached to suitable secure anchors such as the floor of a helicopter. Accelerometer 98 is located under seat 82 but may be located at other locations.

Figure 3B:
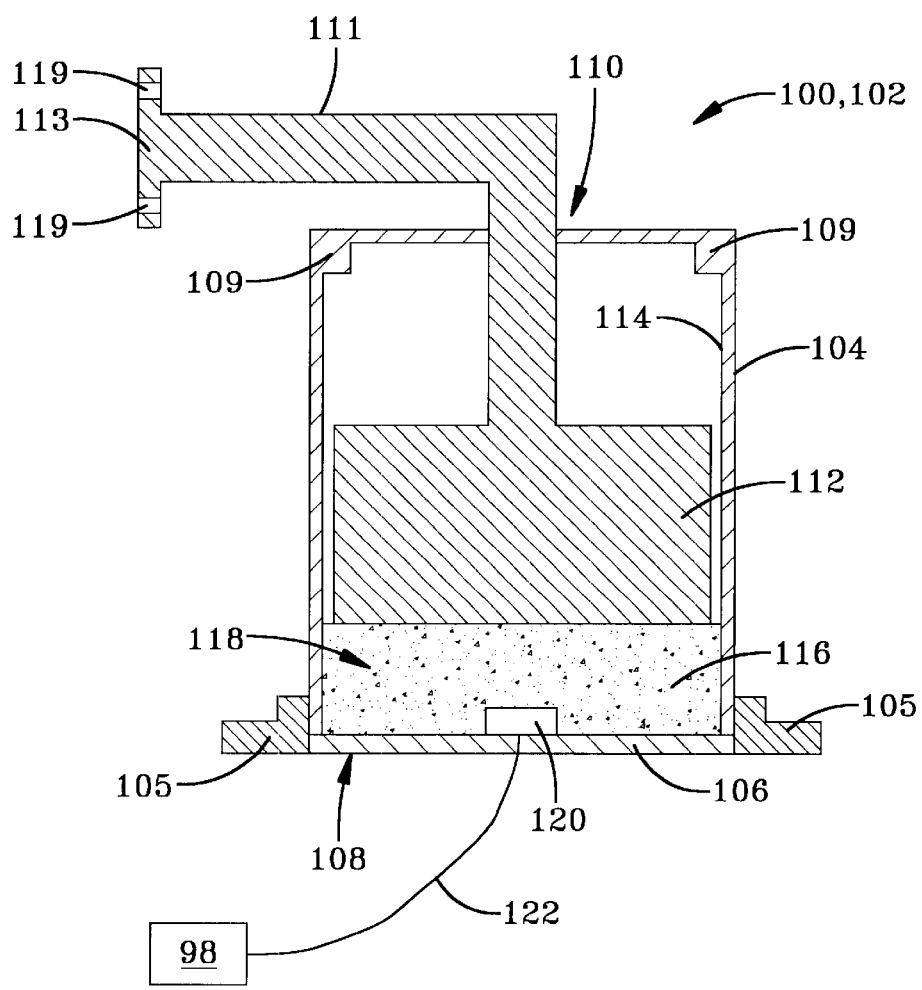
FIG. 3b is a view showing an activator of the explosive type.

As shown in FIG. 3b, activators 100 and 102 include hollow cylinder 104 having integral mounting ears 105 for attachment to, for example, first and second rails 84 and 85 or to the floor. End cap 106 seals first end 108. Movable piston 112 is located within bore 114 and includes mounting arm 111 and flange 113. Second end 110 is open to accommodate mounting arm 111. Explosive material 116, such as gun powder, is located in cavity 118. Primer 120 is located proximate explosive material 116 and includes trigger wire 122. Lip 109 prevents piston 112 from exiting bore 114. Flange 113 of activator 100 is preferably attached to the forwardly portion of first side 94 and flange 113 of activator 102 is preferably attached to the forwardly portion of second side 96 but may be attached to other locations, for example, to front 97. Trigger wires 122 of each activator are attached to accelerometer 98. When a preselected acceleration is sensed by accelerometer 98, such as in a crash event, a signal is generated by accelerometer 98 and delivered, via trigger wires 122, to primers 120, activating explosive materials 116. The resultant gas pressure forces pistons 112 upwardly causing seat 82 to rotate about the axis of pivot 92 thereby repositioning seat 82 to a more reclining position.

Figure 4:
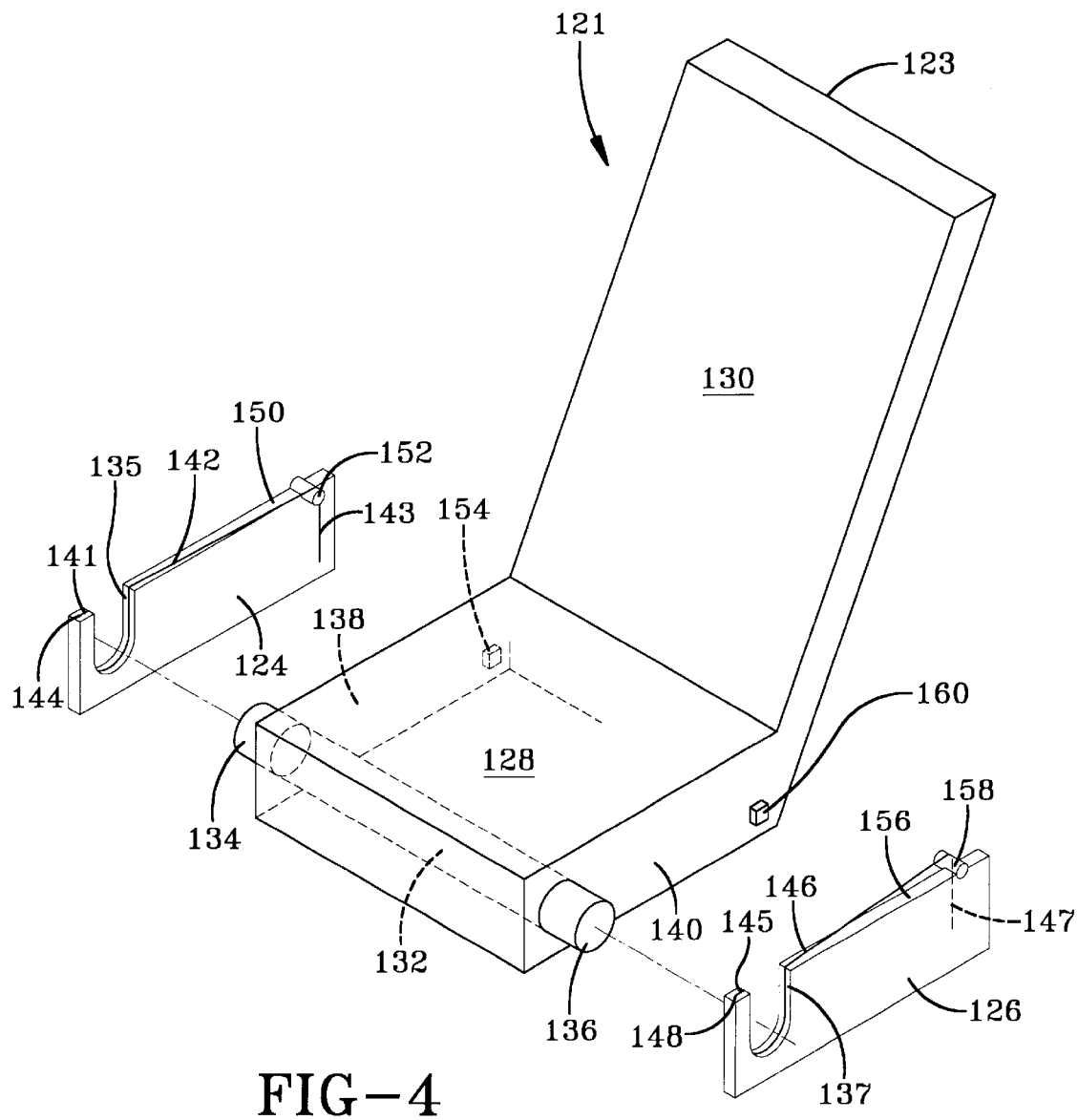
FIG. 4 is a view showing an embodiment of the present invention wherein wires are utilized to reposition and lift the seat.

FIG. 4 shows another embodiment of the present invention. As shown in FIG. 4, seat assembly 121 includes seat 123 (supporting means), first rail 124 and second rail 126. Seat 123 includes base 128 and back 130. First end 134 of pivot 132 extends outwardly from the forwardly portion of first side 138 and second end 136 extends outwardly from the forwardly portion of second side 140. First end 134 sits in slot 135 and second end 136 sits in slot 137. First end 141 of wire 142 is attached to first rail 124 at point 144 and extends rearwardly along upper portion 150, under end 134 of pivot 132 and then over pivot 152. The second end 143 of wire 142 is attached to anchor 154. Similarly, first end 145 of wire 146 is attached to second rail 126 at point 148 and extends rearwardly along upper portion 156, under end 136 of pivot 132 and then over pivot 158. The second end 147 of wire 146 is attached to anchor 160. When crash energy is progressively applied to base 128, anchors 154 and 160 place wires 142 and 146 respectively, in progressively greater tension. Wires 142 and 146 pull up on ends 134 and 136 respectively, of pivot 132 thereby raising the forwardly portion of seat 123 and lowering the rearwardly portion. of seat 123. It can thus be seen that seat 123 is repositioned to a more reclining position.

It can thus be seen that the present invention provides a seat assembly that can utilize energy sources, such as explosive charges, to reposition the seat to a more favorable position. It can also be seen that the present invention can utilize, either alone or in combination with other energy sources, the energy available from a crash event to cause the seat to be repositioned to a more favorable position. In addition, the present invention may act to absorb a portion of the crash energy thereby reducing the force of the impact event to the occupant.

Obviously, many modifications and variations of the present invention are possible in light of the above teachings. It is therefore to be understood, that within the scope of the appended claims, the invention may be practiced otherwise than as specifically described.

What is claimed is:

1. An apparatus for repositioning an occupant and absorbing at least a part of the energy of a crash event comprising:
   a) a seat having a back and a base, the base including a first side and a second side;
   b) a pivot attached to the forwardly portion of said base and extending outwardly from both the first side and the second side of said base;
   c) first and second energy absorbers, the first energy absorber attached to said first side of said base and the second energy absorber attached to said second side of said base, said energy absorbers located rearwardly of the pivot;
   d) first and second rails, the first rail located adjacent said first side of said base and the second rail located adjacent said second side of said base for communicating with said pivot, said first and said second rails attached to said first and second energy absorbers;
   wherein said energy absorbers deform in response to the force of a crash event and absorb at least a part of the energy of said crash, said energy absorbers also allowing said seat to rotate about said pivot to a more desirable position.

2. The apparatus defined in claim 1, wherein said energy absorbers are hydraulic devices.

3. The apparatus defined in claim 1, wherein said energy absorbers are wire bending devices.

4. The apparatus defined in claim 1, wherein said energy absorbers are crushable honeycomb.

5. An apparatus for repositioning an occupant and absorbing at least a part of the energy of a crash event comprising:
   a) a seat having a back and a base, the back having a first side and a second side and the base having a first side and a second side;
   b) first and second rails, the first rail positioned and arranged proximate the first side of said back and said base and the second rail positioned and arranged proximate the second side of said back and said base;
   c) at least two pairs of rollers attached to said seat;
   d) a guide track for each pair of said rollers, the guide tracks located in said first and second rails, said guide tracks shaped and arranged to define a predetermined path;
   e) an energy absorbing wire located in each guide track;
   wherein each said pair of rollers, said guide track and said energy absorbing wire communicate to allow said seat to move in response to a crash event to a more desirable attitude, and at least a part of the energy of said crash being absorbed by said energy absorbing wires and by said seat being repositioned to a more desirable position.

6. The apparatus defined in claim 5, wherein the number of pairs of guide rollers is more than 2.

7. An apparatus for repositioning an occupant and absorbing at least a part of the energy of a crash event comprising:
   a) a seat having a back and a base, the base including a first side and a second side;
   b) a pivot attached to the rearwardly portion of said base and extending outwardly from both the first side and the second side of said base;
   c) activators attached to the forwardly portion of said base, the activators including a primer;
   d) a first rail and a second rail for receiving said pivot, the first rail located proximate said first side of said base and the second rail located proximate said second side of said base;
   e) an accelerometer for generating a signal in response to a preselected acceleration and activating said activators.

8. An apparatus for repositioning an occupant and absorbing at least a part of the energy of a crash event comprising:
   a) a seat having a back and a base, the base including a first side and a second side;
   b) a pivot attached to the forwardly portion of said base, the pivot having a first end and a second end, the first end of the pivot extending outwardly from the first side of the base and the second end of the pivot extending outwardly from the second side of the base;
   c) a first rail located proximate said first side of said base for receiving said first end of said pivot and a second rail located proximate said second side of said base for receiving said second end of said pivot;
   d) a first wire communicating with said first side of said seat, said first end of said pivot and said first rail;
   e) a second wire communicating with said second side of said seat, said second end of said pivot and said second rail;
   wherein crash energy is progressively applied to said seat progressively placing said first and said second wires in progressively greater tension thereby raising the forwardly portion of said seat via said first and second ends of said pivot, and lowering the rearwardly portion of said seat.

* * * * *